United States Patent
Nishida et al.

(10) Patent No.: US 12,112,275 B2
(45) Date of Patent: Oct. 8, 2024

(54) LEARNING DEVICE, LEARNING METHOD AND LEARNING PROGRAM

(71) Applicant: NIPPON TELEGRAPH AND TELEPHONE CORPORATION, Tokyo (JP)

(72) Inventors: Kosuke Nishida, Tokyo (JP); Kyosuke Nishida, Tokyo (JP); Hisako Asano, Tokyo (JP); Junji Tomita, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 687 days.

(21) Appl. No.: 17/293,434

(22) PCT Filed: Nov. 8, 2019

(86) PCT No.: PCT/JP2019/043867
§ 371 (c)(1),
(2) Date: May 12, 2021

(87) PCT Pub. No.: WO2020/100739
PCT Pub. Date: May 22, 2020

(65) Prior Publication Data
US 2021/0383257 A1 Dec. 9, 2021

(30) Foreign Application Priority Data

Nov. 15, 2018 (JP) .................... 2018-215088

(51) Int. Cl.
*G06N 5/04* (2023.01)
*G06F 40/20* (2020.01)
*G06N 3/045* (2023.01)

(52) U.S. Cl.
CPC .............. *G06N 5/04* (2013.01); *G06F 40/20* (2020.01); *G06N 3/045* (2023.01)

(58) Field of Classification Search
CPC .......... G06N 5/04; G06N 3/045; G06N 3/042; G06N 3/084; G06F 40/20; G06F 40/35; G06F 40/30; G06F 16/00; G06F 16/90
See application file for complete search history.

(56) References Cited

U.S. PATENT DOCUMENTS

| | | | |
|---|---|---|---|
| 2018/0032581 A1* | 2/2018 | Baldeschi | G06F 16/2457 |
| 2020/0057807 A1* | 2/2020 | Kapur | G06N 3/045 |
| 2021/0342399 A1* | 11/2021 | Sisto | G06N 3/04 |

OTHER PUBLICATIONS

Hua et al. (2018) "Neural Argument Generation Augmented with Externally Retrieved Evidence" Proceedings of the 56th Annual Meeting of the Association for Computational Linguistics (vol. 1: Long Papers) Jul. 2018, Melbourne, Australia, pp. 219-230.

* cited by examiner

Primary Examiner — Daniel C Washburn
Assistant Examiner — Athar N Pasha

(57) ABSTRACT

There is provided a learning device for learning a neural network used for search of external knowledge in order to increase search accuracy of external knowledge required for arithmetic processing. With an input sentence Q as an input, an external knowledge search unit 22 selects pieces of external knowledge based on similarity degrees between pieces of external knowledge included in an external knowledge database 2 and the input sentence Q, using a neural network, and causes the selected pieces of external knowledge to be search results R2. A processing unit 14 acquires a response sentence A to the input sentence Q by arithmetic processing with the input sentence Q and the selected pieces of external knowledge as an input. A consideration calculation unit 23 calculates a consideration v determined from an index indicating correctness of the response sentence A based on a true output T given to the input sentence Q in advance and an index indicating quality of the selected pieces of external knowledge. A learning unit 26 updates (Continued)

neural network parameters of the second external knowledge search unit 22 using the consideration v.

20 Claims, 9 Drawing Sheets

```
while k = 1,2, ...
    STEP1.      for  i=1,2,...,L; j=1,2,...,N
                    e_{ij} = f(r_j, q, p_i, c)
    STEP2.      a = g(E)
    STEP3.      sample pieces of knowledge r_{SK} from probability distribution a
    STEP4.      S = [S; s_k]
    STEP5.      u_k = a_{s_k}
    STEP6.      c = h(R, S)
    STEP7.      if END CONDITION then break
    return S
```

LEARNING DEVICE, LEARNING METHOD AND LEARNING PROGRAM

CROSS-REFERENCE TO RELATED APPLICATIONS

This application is a U.S. 371 Application of International Patent Application No. PCT/JP2019/043867, filed on 8 Nov. 2019, which application claims priority to and the benefit of JP Application No. 2018-215088, filed on 15 Nov. 2018, the disclosures of which are hereby incorporated herein by reference in their entireties.

TECHNICAL FIELD

The present invention relates to a learning device, a learning method and a learning program for improving external knowledge search accuracy in natural language processing using external knowledge.

BACKGROUND ART

Recently, due to the rise of deep learning technology and proper preparation of data sets used for natural language processing, language processing, such as a question/response and a dialogue for a sentence, by AI (Artificial Intelligence) has been attracting attention.

When a human being understands a natural language and makes an answer, he can infer the answer to the question he has understood, based on his own experience, common sense and world knowledge. For example, when a human being reads a sentence and makes an answer to a question about the sentence, he finds the answer not only from the sentence but also from his own experience and the like. In the case of AI, however, it is necessary to infer an answer only from information included in a sentence targeted by a question. Therefore, it is thought that a question/response and a dialogue by AI are limited.

In order to exceed this limit, it is effective to infer an answer using not only a sentence targeted by a question but also external knowledge obtained from external sentences, especially in a question/response model in the natural language processing. This technology has a merit that it is possible to handle extensive external knowledge. On the other hand, there is a problem that the vaster the external knowledge is, the more the time complexity and the space complexity increase. Especially, in order to handle a set of a great number of sentences existing in external knowledge with a practical amount of calculation, it is necessary to narrow down the number of sentences of the external knowledge by prior search. As a conventional method using such external knowledge, a technique of using an external text corpus in a neural network is known (for example, Non-Patent Literature 1).

CITATION LIST

Non-Patent Literature

Non-Patent Literature 1: Xinyu Hua, Lu Wang, "Neural Argument Generation Augmented with Externally Retrieved Evidence" College of Computer and Information Science Northeastern University Boston, MA 02115, temarXiv: 1805.10254v1 [cs.CL], May 25, 2018

SUMMARY OF INVENTION

Technical Problem

A model in Non-Patent Literature 1 is a dialogue model for obtaining a response sentence as an answer to an utterance sentence (or a question sentence). As shown in FIG. 13, for example, ten sentences are extracted from an external knowledge database 2 (for example, a corpus) which is an external knowledge search target by an external knowledge search unit 51 first. As an external knowledge search method, sentences similar to an utterance sentence Q are searched for from the external knowledge database 2, using sentence similarity degrees obtained from TF-IDF (Term Frequency-Inverse Document Frequency). Next, an external knowledge combination unit 53 performs an operation of connecting retrieved ten sentences R after the utterance sentence. Lastly, by inputting an utterance sentence QR newly made by connecting the retrieved ten sentences with the utterance sentence Q, to a neural network of a response unit 54, a response sentence A is obtained as an output. In the neural network, multitask Seq2Seq (Sequence to Sequence) processing described in Reference Literature 1 is performed.

Reference Literature 1: Minh-Thang Luong, Quoc V. Le, Ilya Sutskever, Oriol Vinyals, Lukasz Kaiser "MULTI-TASK SEQUENCE TO SEQUENCE LEARNING" Published as a conference paper at ICLR 2016

In Non-Patent Literature 1, the external knowledge search unit 51 performs search for pieces of external knowledge similar to an utterance sentence using similarity degrees obtained from TF-IDF. As advantages of adopting a method other than a neural network, such as TF-IDF, the following two advantages are given: (1) learning of parameters required to be performed to use a neural network is not required, and (2) the amount of calculation is smaller in comparison with a neural network. On the other hand, in the search method using TF-IDF, an input sentence is treated only in units of words, and a sequence of words and a structure of the sentence are not considered. Therefore, the following disadvantages exist: (1) the search method is inferior to a method using a neural network in accuracy; and (2) the accuracy must be compensated for by increasing the number of search result sentences.

Dialogue processing shown in Non-Patent Literature 1 only has to generate a sentence with content within a range allowed as an answer to an inputted utterance sentence as a response sentence and, therefore, high external knowledge search accuracy is not required. However, in a response sentence generation process for generating a response sentence to a question sentence, an accurate answer to the question sentence is required, and, therefore, it is necessary to search for external knowledge required to answer the question sentence more accurately than the dialogue processing.

In order to handle a set of a great number of sentences with a practical amount of calculation, it is necessary to narrow down the number of sentences by search beforehand. However, in the search method using similarity degrees of TF-IDF, an input sentence is treated only in units of words, and search accuracy is insufficient. Therefore, if the number of searches is narrowed down too much, there is a possibility that sentences required for the response sentence generation process are omitted, and it is not possible to perform sufficient narrowing down.

The present invention has been made in view of the above situation, and an object is to provide a learning device, a learning method and a learning program that are capable of learning parameters for an external knowledge search process so that it becomes possible to search for external knowledge required for arithmetic processing with a high accuracy.

Means for Solving the Problem

In order to achieve the above object, a learning device of the present invention includes: an external knowledge search unit calculating scores obtained from similarity degrees between an input sentence and pieces of external knowledge included in an external knowledge database, selecting pieces of external knowledge based on the scores and causing the selected pieces of external knowledge to be search results; a processing unit acquiring an output to the input sentence by predetermined arithmetic processing with the input sentence and the selected pieces of external knowledge as an input; a consideration calculation unit calculating, based on the input sentence, the acquired output, the selected pieces of external knowledge and a true output given to the input sentence in advance, a consideration determined from an index indicating correctness of the output relative to the true output and an index indicating quality of the selected pieces of external knowledge; and a learning unit updating parameters of the first neural network using the consideration.

The "knowledge" refers to electronic data in which a natural language is recorded and refers to a unit having a meaning, which is configured with a plurality of words.

The "natural language" refers to a symbol system used by human beings for daily mutual understanding and refers to what is written as characters and symbols.

It is desirable that the learning device is a learning device further including an external knowledge combination unit, wherein, with a processing target sentence and the input sentence as an input, the external knowledge search unit selects the pieces of external knowledge based on two kinds of similarity degrees, the similarity degrees between the pieces of external knowledge included in the external knowledge database and the input sentence and similarity degrees between the pieces of external knowledge and the processing target sentence, using the first neural network; the external knowledge combination unit generates an external knowledge combination process target sentence obtained by combining the pieces of external knowledge included in the search results with the processing target sentence; the processing unit acquires an output to the input sentence by the predetermined arithmetic processing with the input sentence and the external knowledge combination process target sentence as an input; and the consideration calculation unit calculates, based on the processing target sentence, the input sentence, the acquired output, the selected pieces of external knowledge and the true output given to the input sentence in advance, the consideration determined from the index indicating the correctness of the output relative to the true output and the index indicating the quality of the selected pieces of external knowledge.

Note that the input sentence is a question sentence; the processing unit performs a response sentence generation process using a second neural network as the predetermined arithmetic processing and acquires a response sentence to the question sentence as the output; and the learning unit updates the parameters of the first neural network and parameters of the second neural network using the consideration.

In a learning method of the present invention, a computer executes: an external knowledge search step of calculating scores obtained from similarity degrees between an input sentence and pieces of external knowledge included in an external knowledge database, selecting pieces of external knowledge based on the scores and causing the selected pieces of external knowledge to be search results; a processing step of acquiring an output to the input sentence by predetermined arithmetic processing with the input sentence and the selected pieces of external knowledge as an input; a consideration calculation step of calculating, based on the input sentence, the acquired output, the selected pieces of external knowledge and a true output given to the input sentence in advance, a consideration determined from an index indicating correctness of the output relative to the true output and an index indicating quality of the selected pieces of external knowledge; and a learning step of updating parameters of the first neural network using the consideration.

A learning program of the present invention is a program for causing a computer to function as each unit of the learning device described above.

Effects of the Invention

According to the present invention including the above features, in order to use external knowledge for arithmetic processing, the external knowledge is searched for using a neural network at the time of searching a huge amount of external knowledge in an external knowledge database, and an appropriate output is generated for an input sentence. By learning the neural network using a consideration determined from an index indicating correctness of the output relative to a true output and an index indicating quality of selected external knowledge, it becomes possible to search for external knowledge required for the arithmetic processing with a higher accuracy.

DESCRIPTION OF EMBODIMENTS

Embodiments of the present invention will be described in detail below with reference to drawings.

Figure 1:
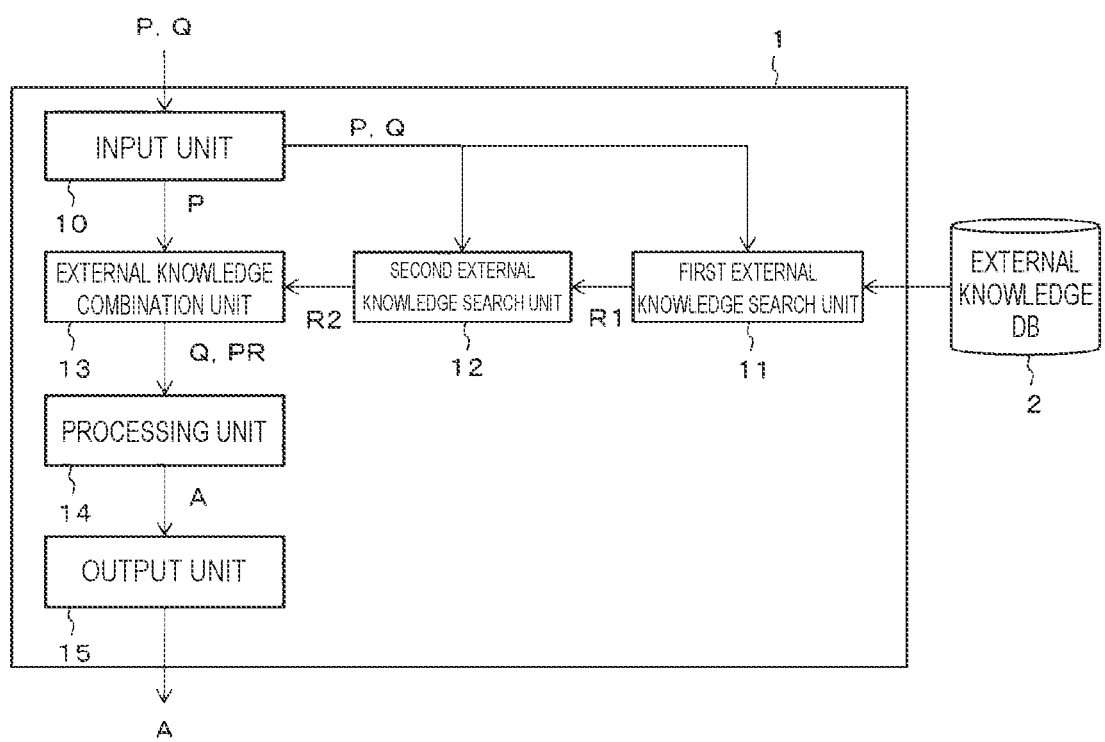
FIG. 1 is a block diagram showing a configuration of a processing device according to a first embodiment of the present invention.

FIG. 1 is a functional block diagram showing an example of a configuration of a processing device 1 according to a first embodiment of the present invention.

The processing device 1 is configured with a computer or a server computer provided with well-known hardware such as a processor, a main memory, an auxiliary memory, a data bus, an input/output interface and a communication interface. Further, by various kinds of programs constituting a processing program being executed by the processor after being loaded onto the main memory, the various kinds of programs function as units of the processing device 1. Though the various kinds of programs are stored in the auxiliary memory provided in the processing device 1 in the present embodiment, the storage destination of the various kinds of programs is not limited thereto. The various kinds of programs may be recorded in a recording medium such as a magnetic disk, an optical disk and a semiconductor memory or may be provided through a network. Further, any other component is not necessarily required to be realized by a single computer or a server computer but may be realized being distributed among a plurality of computers connected via a network.

The processing device 1 shown in FIG. 1 is provided with an input unit 10, a first external knowledge search unit 11, a second external knowledge search unit 12, an external knowledge combination unit 13, a processing unit 14 and an output unit 15. Further, an external knowledge database 2 is connected to the processing device 1.

In the present embodiment, the external knowledge database 2 is assumed to be outside the processing device 1. Though description will be made on a case where the processing device 1 is connected to the external knowledge database 2, for example, via communication means such as the Internet where communication is performed according to the protocol of TCP/IP (Transmission Control Protocol/Internet Protocol), the communication means is not limited thereto but may be communication means according to other protocols.

The external knowledge database 2 refers to a set of pieces of knowledge obtained by collecting a great number of natural language sentences. For example, a database in which hundreds of thousands of or more pieces of knowledge are stored is preferred. Especially, a corpus, which is a set of pieces of knowledge obtained by structuring and accumulating natural language sentences on a large scale, is desirable. For example, Wikipedia and the like can be used. Note that a piece of knowledge is a sentence configured with one to several sentences.

It is possible to use a large number of knowledge databases existing in the Internet space as the external knowledge database 2 as necessary. Further, a plurality of knowledge databases may be used as the external knowledge database 2. Pieces of knowledge stored in the external knowledge database 2 will be described as pieces of external knowledge below.

A large number of pieces of external knowledge are stored in the external knowledge database 2. Therefore, if it is attempted to obtain an optimal piece of external knowledge corresponding to an input sentence by comparing all the pieces of external knowledge with the input sentence, the amount of calculation is huge. Therefore, in the present embodiment, search targets are narrowed down by two stages.

In the first embodiment, description will be made on a case where a processing target sentence P is inputted in addition to an input sentence Q, and arithmetic processing performed by the processing unit 14 is a response sentence generation process. Specifically, it is assumed that the input sentence Q is a question sentence, and that the processing target sentence P is a question target sentence. Hereinafter, description will be made with the question sentence being indicated by Q and the question target sentence being indicated by P. Further, the question target sentence P is a sentence from which an answer to the question sentence Q is created, and the question Q is a sentence indicating a question to the question target sentence P. The description will be made on a case where the question sentence Q is configured with one sentence, and the question target sentence P is configured with one to several sentences.

The input unit 10 accepts input of data of a question target sentence P and a question sentence Q via the input/output interface and stores the data onto the auxiliary memory once. The question target sentence P and the question sentence Q may be data transmitted from an external terminal device connected via a network and received.

The first external knowledge search unit 11 obtains first scores based on two kinds of similarity degrees, similarity degrees between the pieces of external knowledge included in the external knowledge database 2 and the question sentence Q and similarity degrees between the pieces of external knowledge and the question target sentence. Based on the first scores, pieces of external knowledge are searched for from the external knowledge database 2 and caused to be first search results R1.

As the similarity degrees for obtaining the first scores, similarity degrees obtained by comparing appearance frequencies of words included in the pieces of external knowledge, the question sentence Q and the question target sentence P can be used. For example, a method can be used in which each of the sentences is divided into words, and a sentence similarity degree is determined using an appearance frequency of each word appearing in the sentence, and such an index that shows a low value if the word appearing in the sentence is a word that often appears in various sentences and shows a high value if the word is a rare word that seldom appears. Specifically, similarity degrees obtained using TF-IDF may be determined as first similarity degrees. Pieces of external knowledge similar to the question sentence Q and the question target sentence P, for example, a specified number of pieces of external knowledge from the top when ranking with scores of the first similarity degrees is used are outputted as the first search results R1. As similarity degrees, the two kinds of similarity degrees, the similarity degrees between the pieces of external knowledge and the question sentence Q and the similarity degrees between the pieces of external knowledge and the question target sentence P, are obtained. Therefore, linear sums between the two kinds of similarity degrees, for example, averages between the two kinds of similarity degrees are used as the first scores. Or alternatively, pieces of external knowledge having first scores equal to or above a reference value are outputted as the first search results R1.

In the external knowledge database 2, tens of thousands to hundreds of thousands of pieces of external knowledge are stored. First, the first external knowledge search unit 11 searches for, for example, about ten to a hundred of pieces of external knowledge from the external knowledge database 2 using similarity degrees by TF-IDF and causes the pieces of external knowledge to be the first search results R1. The number of first search results R1 can be appropriately determined according to accuracy and the like and is not limited to the range described above.

The second external knowledge search unit 12 obtains second scores from the following two kinds of similarity degrees using a neural network learned in advance (a first neural network). The first kind is similarity degrees between the pieces of external knowledge included in the first search results R1 and the question sentence Q. The second kind is similarity degrees between the pieces of external knowledge included in the first search results R1 and the question target sentence P. Based on the second scores, pieces of external knowledge are searched for from the first search results R1 and caused to be the second search results R2.

Specifically, the second external knowledge search unit 12 determines the similarity degrees using a method of converting a sentence to a fixed-length vector by a neural network. First, each of the pieces of external knowledge included in the first search results R1, the question sentence Q and the question target sentence P are converted to a fixed-length external knowledge vector, question sentence vector and question target sentence vector by a neural network learned in advance. Next, for each of the pieces of external knowledge, an inner product of the external knowledge vector and the question sentence vector is determined and caused to be a similarity degree between the piece of external knowledge and the question sentence Q, and an inner product of the external knowledge vector and the question target sentence vector is determined and caused to be a similarity degree between the piece of external knowledge and the question target sentence P. Thereby, the two kinds of similarity degrees are calculated. The pieces of external knowledge included in the first search results R1 are ranked, with linear sums between the two kinds of similarity degrees or averages of the linear sums as the second scores, and a predetermined number of pieces of external knowledge from the top are outputted as the second search results R2. Or alternatively, pieces of external knowledge having similarity degrees equal to or above a reference value are outputted as the second search results R2.

As the neural network learned in advance, a neural network that performs conversion to a sentence embedding vector using a sentence embedding technique can be used. Here, embedding is a technique for converting a natural language component such as a sentence, a word, a character or the like that are targets handled in a neural network to a vector. In the present embodiment, description will be made on a case where sentences included in the pieces of external knowledge included in the first search results R1, a question sentence Q and a question target sentence P are converted to sentence embedding vectors using the sentence embedding technique. In the sentence embedding method, a model for converting a sentence to a fixed-length embedding vector, which has been learned beforehand by an existing natural language corpus is provided. A sentence embedding vector is a fixed-length vector indicating a meaning of a sentence. As a method for converting a sentence to a sentence embedding vector using a neural network, for example, Universal Sentence Encoder described in Reference Literature 2 below or the like can be used. Note that, in the description below, a vector obtained by converting a word using a word embedding technique (to be described later) is referred to as a word embedding vector, and the word embedding vector will be described separately from the sentence embedding vector which is obtained by converting a sentence.

Reference Literature 2: Daniel Cera, Yinfei Yanga, Shengyi Konga, Nan Huaa, Nicole Limtiacob, Rhomni St. Johna, Noah Constanta, Mario Guajardo-C'espedesa, Steve Yuanc, Chris Tara, Yun-Hsuan Sunga, Brian Stropea, Ray Kurzweil "Universal Sentence Encoder", arXiv: 1803.11175v2 [cs.CL]12 April 2018

As described above, by using a non-neural-network method with a small amount of calculation like the first external knowledge search unit 11 first, the amount of calculation for narrowing down tens of thousands of or more pieces of external knowledge in the external knowledge database, which is the largest amount of calculation, to dozens of pieces of external knowledge can be reduced. Next, since the second external knowledge search unit 12 performs narrowing down of the first search results R1 with the method using a neural network, accuracy is high, and it becomes possible to further narrow down the dozens of pieces of external knowledge narrowed down by the first external knowledge search unit 11 to a small number of best pieces of external knowledge. By using such a two-stage search method by the first external knowledge search unit 11 and the second external knowledge search unit 12, it becomes possible to reduce the amount of calculation, and, furthermore, it becomes possible to increase accuracy of external knowledge search results irrespective of the small amount of calculation.

By using a neural network learned beforehand for sentence embedding or the like, as a neural network, it is possible to suppress costs for learning a neural network used by the second external knowledge search unit 12. If a neural network learned beforehand is not used, it is necessary to perform learning for improving search accuracy of the second external knowledge search unit 12. Specifically, the search accuracy must be improved by preparing combinations of a question sentence Q, a question target sentence P and a true response sentence corresponding thereto as data sets for learning and performing learning. Therefore, it takes much time until practical use is realized, and a development load is high.

The external knowledge combination unit 13 generates an external knowledge combined question target sentence PR as an external knowledge combination process target sentence obtained by combining a character string of the question target sentence P and character strings of the pieces of external knowledge included in the second search results R2.

The processing unit 14 performs the response sentence generation process, with the question sentence Q and the pieces of external knowledge included in the second search results R2 as an input, and outputs a response sentence A to the question sentence Q. In the present embodiment, the processing unit 14 inputs the question sentence Q and further inputs the external knowledge combined question target sentence PR obtained by the external knowledge combination unit 13 as pieces of external knowledge of the second search results R2 to generate the response sentence A. Various existing methods can be used for the response sentence generation process. For example, a method using a neural network (a second neural network) can be used. Specifically, BiDAF (Bi-Directional Attention Flow for Machine Comprehension) described in Reference Literature 3 or the like can be used.

Reference Literature 3: Minjoon Seol Aniruddha Kembhavi2 Ali Farhadil; 2 Hananneh Hajishirzi "BI-DIRECTIONAL ATTENTION FLOW FOR MACHINE COMPREHENSION" arXiv: 1611.01603v5 [cs.CL], Feb. 24, 2017

The output unit 15 outputs the response sentence A to a display device via the input/output interface to display the response sentence A. Or alternatively, the response sentence A may be transmitted to an external terminal device connected via the network. Or alternatively, the response sentence A may be outputted by voice.

Figure 2:
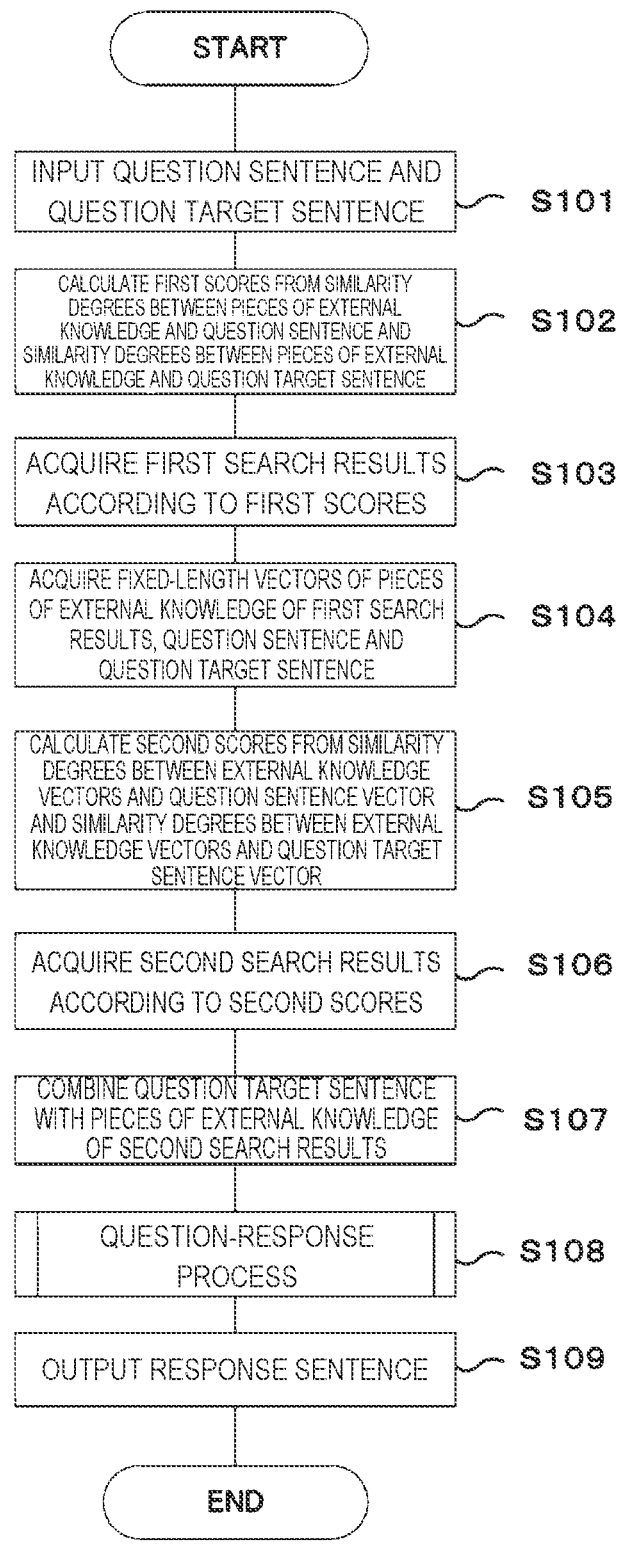
FIG. 2 is a flowchart showing a flow of a response sentence output process by the processing device according to the first embodiment of the present invention.

Next, a flow of a response sentence output process by the processing device 1 in the first embodiment will be described according to a flowchart of FIG. 2.

At step S101, the input unit 10 accepts input of a question sentence Q and a question target sentence P. The first external knowledge search unit 11 searches the pieces of external knowledge stored in the external knowledge database 2, with the question sentence Q and the question target sentence P as a query. At step S102, the first external knowledge search unit 11 calculates similarity degrees between the pieces of external knowledge and the question sentence Q and similarity degrees between the pieces of external knowledge and the question target sentence P using TF-IDF and calculates the first scores from the two kinds of similarity degrees. The first score is higher for a piece of external knowledge more similar to the question sentence Q and the question target sentence P. The pieces of external knowledge of the external knowledge database 2 are ranked using the first scores. At step S103, the first external knowledge search unit 11 narrows down pieces of knowledge with high scores, for example, to about 10 to 100 pieces and causes them to be the first search results R1.

Next, the second external knowledge search unit 12 further searches the first search results R1, with the question sentence Q and the question target sentence P as a query. At step S104, the second external knowledge search unit 12 acquires fixed-length vectors of the pieces of external knowledge of the first search results R1, the question sentence Q and the question target sentence P using a neural network first. At step S105, the second external knowledge search unit 12 calculates the second scores from the two kinds of similarity degrees, similarity degrees between the external knowledge vectors and the question sentence vector and similarity degrees between the external knowledge vectors and the question target sentence vector. At step S106, the second external knowledge search unit 12 ranks the pieces of external knowledge included in the first search results R1 with the second scores and causes several pieces of external knowledge with high scores to be the second search results R2.

Furthermore, at step S107, the external knowledge combination unit 13 generates an external knowledge combined question target sentence PR obtained by combining a character string of the question target sentence P and character strings of the pieces of external knowledge included in the second search results R2. At step S108, the question sentence Q and the external knowledge combined question target sentence PR are inputted to the processing unit 14, and a response sentence A is obtained. Lastly, at step S109, the output unit 15 displays the response sentence A on a screen of a display device of a computer.

Next, a learning device for learning a neural network used by the processing unit 14 of the first embodiment will be described. Note that units configured similarly to those of the processing device 1 will be given the same reference numerals, and description will be omitted.

Figure 3:
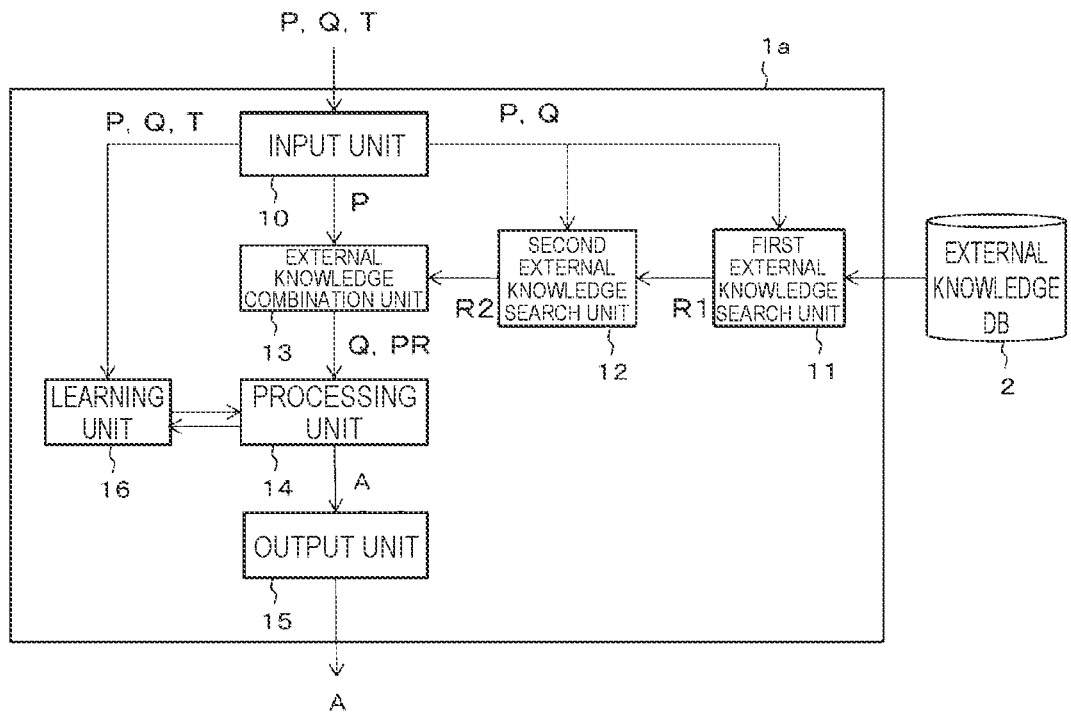
FIG. 3 is a block diagram showing a configuration of a learning device according to the first embodiment of the present invention.

As shown in FIG. 3, a learning device 1a is provided with a learning unit 16 in addition to the input unit 10, the first external knowledge search unit 11, the second external knowledge search unit 12, the external knowledge combination unit 13, the processing unit 14 and the output unit 15.

The learning unit 16 receives input of a true response sentence T to a question sentence Q and a question target sentence P. Then, the learning unit 16 updates parameters of the neural network used by the processing unit 14 using a response sentence A and the true response sentence T so that the true response sentence T is obtained. Here, the response sentence A is generated from the question target sentence P and the question sentence Q using the first external knowledge search unit 11, the second external knowledge search unit 12, the external knowledge combination unit 13 and the processing unit 14 as described above. Update of the parameters can be performed using a gradient method. When a convergence condition is reached, learning is ended. As the convergence condition, the number of iterations can be used. Learning may be ended if the parameters are updated for a predetermined number of (for example, ten thousand) inputs.

Figure 4:
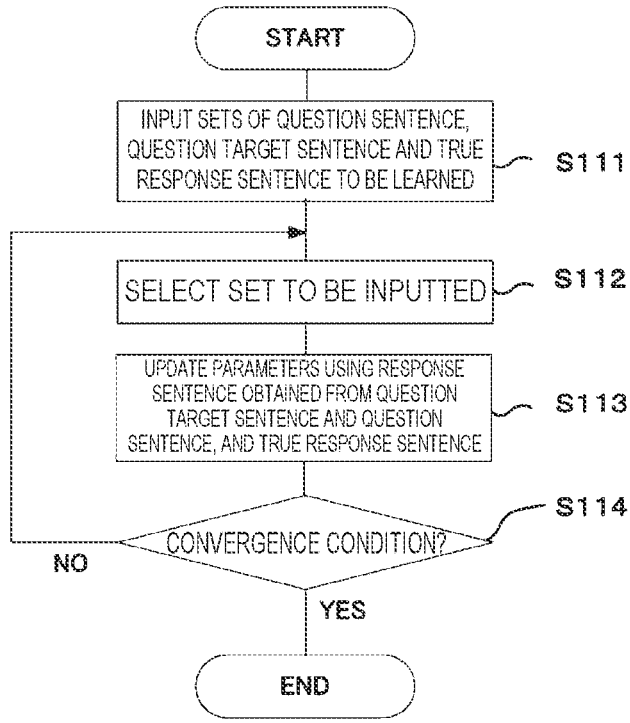
FIG. 4 is a flowchart showing a flow of a learning process by the learning device according to the first embodiment of the present invention.

Next, a flow of a learning process by the learning device 1a of the first embodiment will be described according to a flowchart of FIG. 4.

First, at step S111, the input unit 10 accepts input of a plurality of data sets of a question sentence Q, a question target sentence P and a true response sentence T.

At step S112, a data set to be inputted to the processing unit 14 is selected. Then, at step S113, a response sentence A obtained from the question sentence Q and the question target sentence P, and a true response sentence T are used to perform learning so that a true response sentence T is obtained, and parameters for the neural network used by the processing unit 14 are updated.

At step S114, a judgment about a convergence condition is made. If the convergence condition is not reached, the judgment of step S114 is negative, and a data set to be inputted next is selected at step S112. At S113, the process for updating the parameters is repeated. When the convergence condition is reached, the judgment of step S114 is positive, and update of the parameters ends.

By the parameters for the neural network used by the processing unit 14 being learned in advance by the learning unit 16 as described above, it becomes possible to increase accuracy of a response sentence outputted from the processing unit 14.

Next, a second embodiment will be described. In the second embodiment, a method for improving accuracy of the second external knowledge search unit of the first embodiment described above will be described.

It is thought that improvement of accuracy of a search method can be realized by applying a neural network model having learnable parameters to an external knowledge search process and optimizing the parameters of the model by learning from large-scale data. However, the process for searching for and extracting pieces of external knowledge that is performed in the first embodiment is performed by an indifferentiable operation. Therefore, it is not possible to cause all the parameters to be learned by an error back propagation method, which is usually used in learning of a neural network, regarding the whole processing device as an end2end (end to end) system. Therefore, in the second embodiment, a search method capable of reinforcement learning is used for a second external knowledge search unit.

Since a configuration of a processing device according to the second embodiment of the present invention is similar to that of the processing device 1 according to the first embodiment, detailed description will be omitted.

Figures 5, 6:
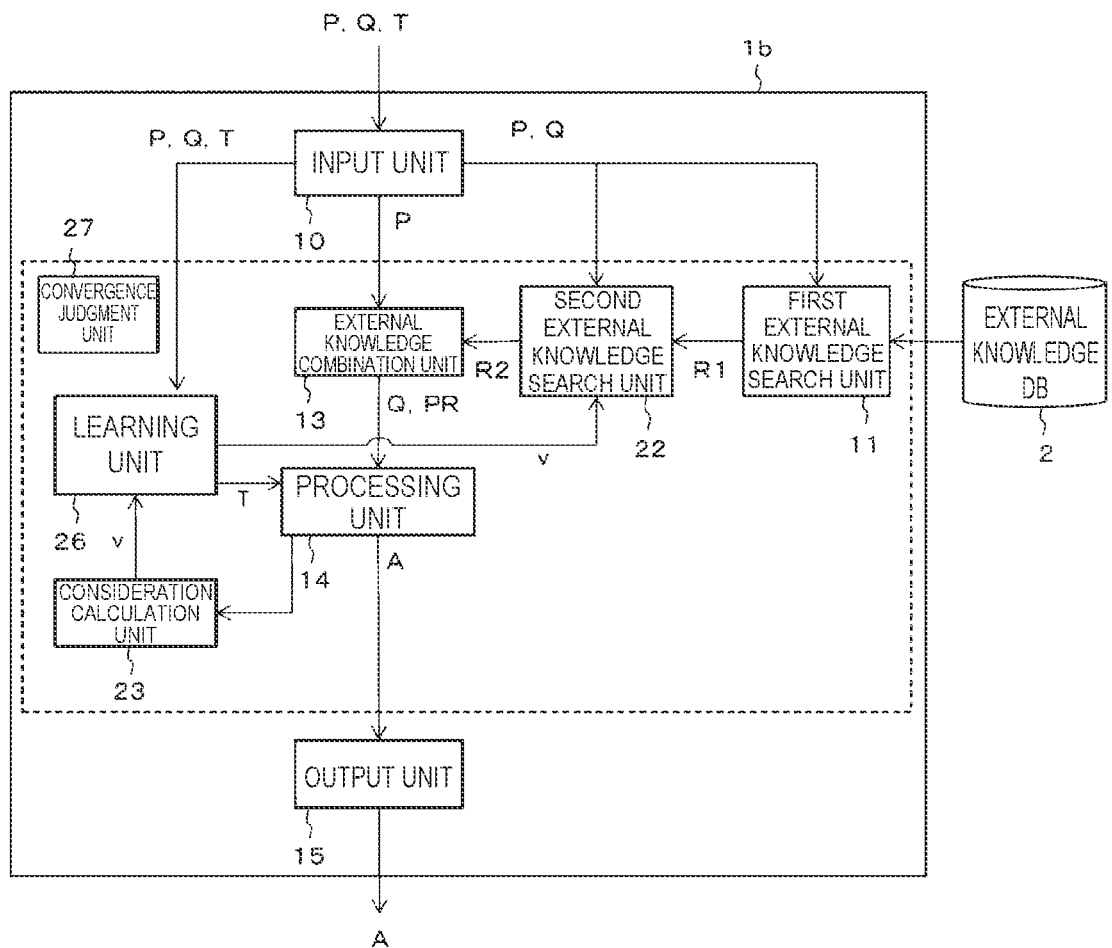
FIG. 5 is a block diagram showing a configuration of a learning device according to a second embodiment of the present invention.
FIG. 6 is a diagram for illustrating an operation performed by a search algorithm of a second external knowledge search unit 22 according to the second embodiment of the present invention.

FIG. 5 is a functional block diagram showing an example of a configuration of a learning device 1b according to the second embodiment of the present invention. Components similar to those of the first embodiment will be given the same reference numerals, and detailed description will be omitted. In the second embodiment, description will be also made on the case where arithmetic processing performed by the processing unit 14 is a response sentence generation process, an input sentence Q is a question sentence, and a processing target sentence P is a question target sentence, similarly to the first embodiment.

The learning device 1b of the second embodiment is provided with the input unit 10, the first external knowledge search unit 11, a second external knowledge search unit 22, the external knowledge combination unit 13, the processing unit 14, the output unit 15, a consideration calculation unit 23, a learning unit 26 and a convergence judgment unit 27. Since the input unit 10, the first external knowledge search unit 11, the external knowledge combination unit 13, the processing unit 14 and the output unit 15 are similar to those of the first embodiment, detailed description will be omitted.

The second external knowledge search unit 22 determines second similarity degrees based on similarity degrees between the pieces of external knowledge included in first search results R1 and a question sentence Q and similarity degrees between the pieces of external knowledge included in the first search results R1 and a question target sentence P, using a neural network (a first neural network). Pieces of external knowledge are selected from the first search results R1 based on the second similarity degrees, and the selected pieces of external knowledge are caused to be second search results R2.

First, the second external knowledge search unit 22 acquires similarity degrees from a fixed-length vector of each of the two sentences of the question sentence Q and the question target sentence P and fixed-length vectors of the pieces of external knowledge included in the first search results R1. As a method for converting a sentence to a fixed-length vector, the second external knowledge search unit 22 can use various vector expressions like (a) to (e) below. For the method for conversion to a fixed-length vector, a method that does not use a neural network like (a) may be used, or methods using a neural network of (b) to (e) may be used.

(a) A vector expression using Bag of Words
(b) A sum vector of or a maximum value vector among existing word embedding vector expressions of GloVe or the like
(c) An output of the last state, that is, the last hour of LSTM (Long short-term memory) with a word embedding vector sequence of a sentence as an input
(d) An existing sentence embedding vector of Universal Sentence Encoder or the like
(e) A vector sequence obtained by a question response model of BiDAF or the like, which is capable of closely observing similarity between a question and a sentence FIG. 6 shows an operation performed by a search algorithm of the second external knowledge search unit 22. The process of the search algorithm of the second external knowledge search unit 22 will be described according to steps of FIG. 6.

The search algorithm of FIG. 6 selects pieces of external knowledge from the first search results R1 to generate the second search results R2 by repeating the operation of steps 1 to 7 until an end condition is satisfied.

In FIG. 6, q indicates a question vector of a question sentence Q; $p_i$ indicates a sentence vector of the i-th sentence among sentences constituting a question target sentence P; and $r_j$ indicates an external knowledge vector of the j-th piece of external knowledge included in a set of pieces of external knowledge of the first search results R1 (hereinafter referred to as a set R1). These vectors are fixed-length vectors, and the number of dimensions is one hundred to tens of thousands. The question target sentence P is configured with L sentences, and a subscript i takes a value of 1 to L. The set R1 is configured with N pieces of external knowledge, and a subscript j takes a value of 1 to N. Further, k indicates the number of iterations of repeating steps 1 to 7.

First, at step 1, scores $e_{ij}$ using similarity degrees for all combinations between the sentence vector $p_i$ of each of the sentences constituting the question target sentence and external knowledge vectors $r_j$ of the pieces of external knowledge included in the set R1 (i indicates 1 to L, and j indicates 1 to N) are calculated using a function f.

$$e_{ij}=f(r_j, q, p_i, c) \quad (1)$$

The function f may be anything that determines scores based on similarity degrees between the pieces of external knowledge included in the first search results R1 and the question sentence Q and similarity degrees between the pieces of external knowledge included in the first search results R1 and the question target sentence P. For example, any of the following two formulas, Formula (2) and Formula (3), is used. The first term of Formula (2) below indicates a similarity degree between the j-th piece of external knowledge and the question sentence Q, and the second term indicates a similarity degree between the j-th piece of external knowledge and the i-th sentence constituting the question target sentence P. The value of the function f is a sum of similarity degrees between the piece of external knowledge and the question sentence Q and similarity degrees between the piece of external knowledge and the i-th sentence constituting the question target sentence P.

[Formula 1]

$$f(r_j, q, p_i, c)=q^T r_j + p_i^T r_j \quad (2)$$

Formula (3) below is a formula when learnable parameters for a neural network are used. The first term of Formula (3) below indicates an importance degree of the j-th piece of external knowledge; the second term indicates a similarity degree between the j-th piece of external knowledge and the question sentence Q; the third term indicates a similarity degree between the j-th piece of external knowledge and the i-th sentence of the question target sentence P; and the fourth term indicates a similarity degree between the j-th piece of external knowledge and a piece of external knowledge already selected. The fifth term indicates a bias.

[Formula 2]

$$f(r_j, q, p_i, c)=w_r^T r_j + q^T W_q r_j + p_i^T W_p r_j - c^T W_h r_j + b \quad (3)$$

Here, $w_r$, $W_q$, $W_p$, $W_h$ and b are parameters that can be learned by the learning unit 26 to be described later. Further, the fourth term c is a real-valued vector with the same fixed length as $r_j$ and $p_i$, expressing all pieces of external knowledge selected by the k-th time. A method for calculating c will be described later. For the first time (k=1), c is set as a zero vector.

Next, at step 2, a probability distribution a indicating degrees of the pieces of external knowledge being easily selected is determined from scores $e_{ij}$ corresponding to the j-th pieces of external knowledge and the i-th sentences of the question target sentence. The degrees of the pieces of external knowledge being easily selected correspond to importance degrees of the pieces of external knowledge. Here, a is an N-dimensional real-valued vector, and a component $a_j$ corresponds to a degree of the j-th piece of external knowledge being easily selected. A component $a_j$ expresses the degree of being easily selected, for example, by a value of 0 to 1.

[Formula 3]

$$a = g(E) \quad (5)$$

Here, $E = \{e_{ij}\}$ is satisfied.

Here, E is a matrix with L rows and N columns, having the scores $e_{ij}$ as components.

A function g is a function to calculate the degree of a piece of external knowledge being easily selected. For the function g, any of the following two formulas, Formula (6) and Formula (7), is used. Note that, if the j-th piece of external knowledge has been already selected, the j-th component of g(E) is set to 0.

[Formula 4]

$$g(E) = \text{softmax}_j \max_i e_{ij} \quad (6)$$

[Formula 5]

$$g(E) = \text{softmax}_j \Sigma_i e_{ij} \quad (7)$$

At step 3, a piece of external knowledge with a higher degree of being easily selected is sampled with a higher probability according to the external knowledge probability distribution a. The sampled pieces of external knowledge are indicated by $r_{s_k}$. Here, $s_k$ indicates an index of a piece of external knowledge selected when the number of iterations is k.

At step 4, an operation of adding indexes $s_k$ of the selected pieces of external knowledge $r_{s_k}$ is performed so that the indexes $s_k$ are connected to a vector S. The indexes $s_k$ of the pieces of external knowledge $r_{s_k}$ selected at the k-th times are sequentially added to the vector S.

Furthermore, at step 5, scalars $u_k$ ($=a_{s_k}$) indicating degrees of the pieces of external knowledge $r_{s_k}$ selected at the k-th times being easily selected are determined. Here, components $a_{s_k}$ of the probability distribution a indicating the degrees of the pieces of external knowledge being easily selected, which has been determined at step 2, are used.

Next, at step 6, fixed-length vectors c of the pieces of external knowledge $r_{s_k}$ selected so far are obtained. The vectors c are determined using a function h below. The function h is a function to obtain a fixed-length vector indicating the pieces of external knowledge selected so far.

$$c = h(R1, S) \quad (8)$$

For the function h, any of the following formulas, Formula (9) and Formula (10), is used. Formula (9) determines a sum of external knowledge vectors of pieces of external knowledge $r_s$ included in a set of the selected pieces of external knowledge.

[Formula 6]

$$h(R1, S) = \Sigma_{s \in S} r_s \quad (9)$$

Formula (10) determines a weighted sum so that greater importance is attached to a piece of external knowledge $r_{s_k}$ that is more easily selected, using the scalars $u_k$ indicating the degrees of the pieces of external knowledge $r_s k$ being easily selected, which have been obtained at step 5.

[Formula 7]

$$h(R1, S) = \Sigma_{K=K} u_K r_{SK} \quad (10)$$

At step 7, it is determined whether the process of steps 1 to 6 is repeated again or not. As an end condition, a method for making the determination with the number of iterations of k and a threshold for max(a) can be used. Or alternatively, a method using dummy knowledge that the process is ended at a time point when a predetermined piece of external knowledge is selected is conceivable. For example, the process may be ended when the number of iterations k reaches ten. When the process ends, the second external knowledge search unit 22 outputs the set of the selected pieces of external knowledge as the second search results R2.

Two methods have been described for each of the above steps 1, 2 and 6. It does not matter how the methods are combined. As the method for the second external knowledge search unit 22 to convert a sentence to a fixed-length vector, the methods of (a) to (e) have been given. Any of the methods may be combined with the process of steps 1 to 7.

Figure 7:
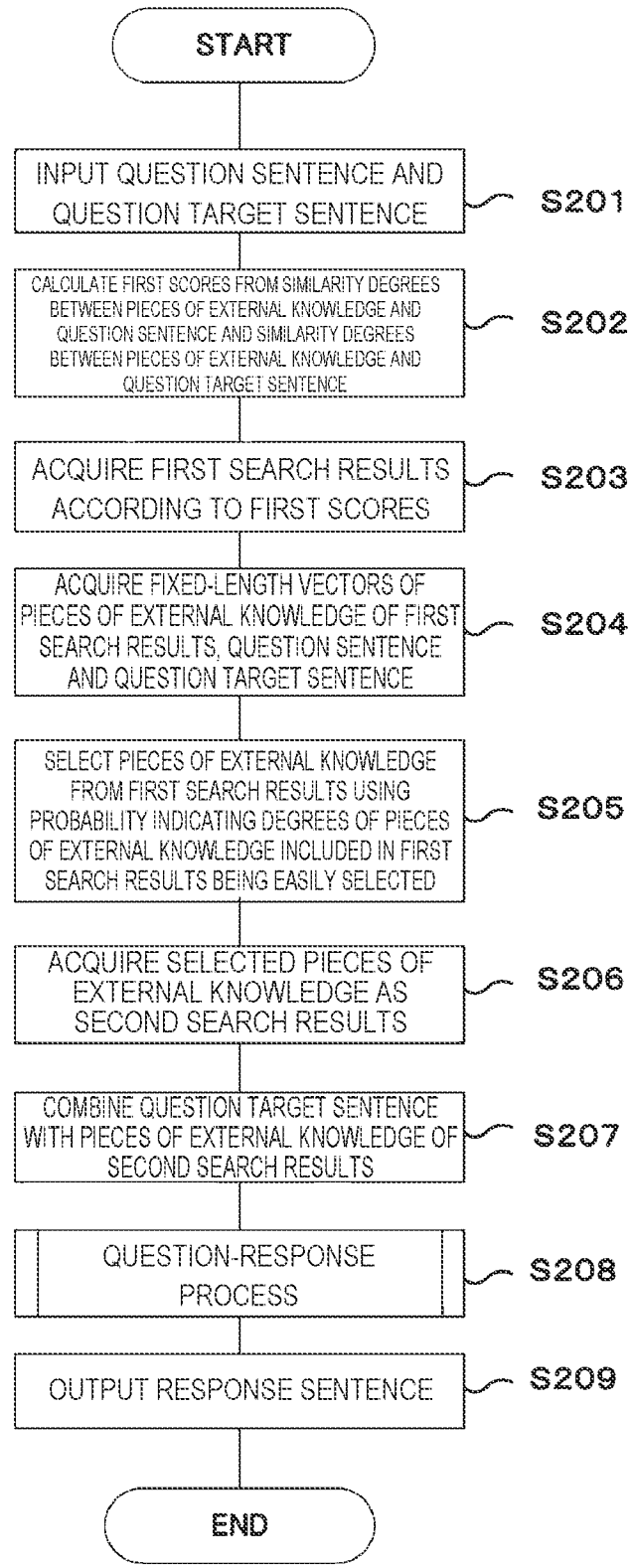
FIG. 7 is a flowchart showing a flow of a response sentence output process by the learning device according to the second embodiment of the present invention.

Next, a flow of a response sentence output process by the processing device 1b in the second embodiment will be described using a flowchart of FIG. 7. Since the process of the second embodiment is similar to that of the first embodiment except for the second external knowledge search unit, detailed description will be omitted, and different parts will be mainly described in detail.

At steps S201 to S203, a process similar to the process of steps S101 to S103 in the first embodiment is performed, and the first search results R1 are acquired. Next, the second external knowledge search unit 22 further searches the first search results R1 using the question sentence Q and the question target sentence P. First, at step S204, the second external knowledge search unit 22 acquires fixed-length vectors of the pieces of external knowledge of the first search results R1, the question sentence Q and the question target sentence P.

At step S205, the second external knowledge search unit 22 repeats the operations of steps 1 to 7 in FIG. 6 and performs selection from the pieces of external knowledge of the first search results R1 until a predetermined end condition is satisfied, using probabilities indicating degrees of the pieces of external knowledge being easily selected. At step S206, the second external knowledge search unit 22 causes pieces of external knowledge selected from the first search results R1 to be the second search results R2.

At steps S207 to S209, a process similar to the process of steps S107 to S109 in the first embodiment is performed, and a response sentence A is outputted.

Next, a method for the learning device 1b to perform reinforcement learning in order to increase search accuracy of the second external knowledge search unit 22 will be described. In the reinforcement learning, learning advances by defining the following two: a policy indicating a probability of taking an action and a consideration obtained by the action. The policy is, for example, the probability distribution a indicating the pieces of external knowledge of the first search results R1 of the second external knowledge search unit 22 being easily selected. The consideration is calculated from the following two: an index indicating correctness of a response sentence relative to a true response sentence and an index about quality of information about selected pieces of external knowledge.

First, at the time of learning, the input unit 10 receives a plurality of data sets each of which includes a true response sentence T to a question sentence Q together with the question Q and a question target sentence P.

The consideration calculation unit 23 calculates a consideration v determined from an index indicating correctness of a response sentence A relative to the true response sentence T and an index indicating quality of pieces of external knowledge selected by the second external knowledge search unit 22, based on the following sentences. Here, the following sentences are the question target sentence P, the question sentence Q, the response sentence A, the selected pieces of external knowledge selected by the second external knowledge search unit 22 and the true response sentence T given for the question sentence Q in advance.

As the index about the correctness of the response sentence A, an index indicating a degree of correspondence between the response sentence A and the true response sentence T such as F1 and Rouge. Rouge is an index used for evaluation of an automatic summarization process and the like in natural language processing and is an index indicating a degree of correspondence between an automatically summarized sentence and a summarized sentence created manually.

Further, as the index indicating the quality of the pieces of external knowledge selected by the second external knowledge search unit 22, a degree of correspondence indicating to what degree information that the question target sentence P and the selected pieces of external knowledge have corresponds to information that the question sentence Q and the response sentence A have can be used. As specific examples of an index calculation method, two methods (i) and (ii) will be shown below.

(i) As the index concerning the quality of the information of the pieces of external knowledge selected by the second external knowledge search unit 22, Rouge between a natural sentence obtained by connecting the question sentence Q and the response sentence A and a natural sentence obtained by connecting the question target sentence P and the selected pieces of external knowledge is obtained.

(ii) As the index concerning the quality of the information of the pieces of external knowledge selected by the second external knowledge search unit 22, a method such as "coverage" described in Reference Literature 4 is used. An index using "coverage" can be indicated by Formula (11) below. Note that, in the case of selecting this method, it is necessary to learn the parameters of Formula (3) used when the second external knowledge search unit 22 calculates the scores $e_{ij}$. Here, the scores $e_{ij}$ can be obtained from similarity degrees between sentence vectors $p_i$ of sentences constituting the question target sentence and the external knowledge vectors $r_j$ of the pieces of external knowledge included in the first search results R1.

[Formula 8]

$$\frac{1}{K}\sum_{k=0}^{K}\sum_{i} \min(\alpha_i^k, \beta_i^k) \quad (11)$$

$$\alpha_i^k = \tilde{q}_i^T W_q r_{s_k}$$

$$\beta_i^k = \tilde{q}_i^T W_q \left( p + \sum_{K=0}^{k-1} r_{s_k} \right)$$

Here, $s_k$ indicates an index of a piece of external knowledge selected when the number of iterations of the second external knowledge search unit 22 is k. Further, K indicates a total number of iterations performed by the second external knowledge search unit 22. Further, $\tilde{q}_i$ is an embedding vector of the natural sentence (a character string obtained by connecting words) obtained by connecting the question sentence Q and the response sentence A, and i indicates positions of words. Further, ~p is an embedding vector of the question target sentence P, and $W_q$ is the same as weights to similarity degrees between the pieces of external knowledge and the question sentence Q of Formula (3).

Reference Literature 4: Abigail See, Peter J. Liu, Christopher D. Manning "Get To The Point: Summarization with Pointer-Generator Networks" arXiv: 1704.04368v2 [cs.CL], Apr. 25, 2017

The learning unit 26 updates parameters of the second external knowledge search unit 22 using the policy and the consideration v by a policy gradient method. As the policy, for example, a probability distribution aj obtained by the second external knowledge search unit 22 is used. When the second external knowledge search unit 22 determines scores using Formula (3) at the time of calculating the scores, the parameters $w_r$, $W_q$, $W_p$, $W_h$ and b of Formula (3) are updated. Further, if any of the above-stated methods (b) to (e) using a neural network is used as a method for converting a sentence to a fixed-length vector, parameters for the neural network are updated.

The consideration v is, for example, a weighted sum of the index indicating the correctness of the response sentence A relative to the true response sentence T and the index indicating the quality of the pieces of external knowledge selected by the second external knowledge search unit 22.

Further, the learning unit 26 updates not only the parameters of the second external knowledge search unit 22 but also parameters of the processing unit 14. As specific examples of a method for learning the parameters of the processing unit 14, two methods (i) and (ii) will be shown below.

(i) A Learning Method Using a Gradient Method

The learning unit 26 receives input of a true response sentence T to a question sentence Q and a question target sentence P, and updates the parameters of the processing unit 14 using a response sentence A and the true response sentence T. Here, the response sentence A is generated from the question target sentence P and the question sentence Q using the first external knowledge search unit 11, the second external knowledge search unit 22, the external knowledge combination unit 13 and the processing unit 14 as described above. Update of the parameters can be performed using a gradient method. As an objective function to perform minimization by the gradient method, an objective function that is generally used at the time of performing learning for a question-response process by a neural network and an error back propagation method can be used. For example, a cross entropy function, which is a general objective function, can be used.

(ii) Reinforcement Learning

An objective function created from F1 or Rouge is an indifferentiable function, and it is not possible to perform learning using a usual gradient method. Therefore, it is necessary to separately prepare an objective function corresponding to a cross entropy function in the gradient method. Therefore, similarly to the second external knowledge search unit 22, the processing unit 14 also can update parameters using the policy and the consideration v by a policy gradient method.

Though the two learning methods have been described above, it is expected more to output a flexible responsible sentence A appropriate for a question sentence in the question-response process by using (ii) than by using (i). For example, in the case of a question-response process of such a type that a response sentence to a question sentence Q is extracted from a given document like a question target document P, the response sentence A can be said to be a correct answer if the response sentence A is a sentence indicating the same meaning even if word order is changed. However, the cross entropy function used in (i) evaluates how easily a section corresponding to a true response sentence T in the question target document P can be outputted. Therefore, all of outputs of word sequences that can be allowed to be correct answers but do not belong to the section corresponding to the true response sentence T are learned as wrong answers. On the other hand, in (ii), the index such as F1 or Rouge used as an objective function can evaluate linguistic similarity before and after change in word order or the like. Therefore, linguistic similarity can be evaluated so that a similarity degree of such a sentence that indicates the same meaning even if word order is changed is high, and it becomes possible to output a flexible response sentence A.

The convergence judgment unit 27 causes search by the first external knowledge search unit 11, search by the second external knowledge search unit 22, generation of an external knowledge combined question target sentence PR by the external knowledge combination unit 13, acquisition of a response sentence A by the processing unit 14, calculation by the consideration calculation unit 23 and update of parameters by the learning unit 26 to be repeated until a convergence condition determined in advance is satisfied. Note that a broken line in FIG. 5 shows components that the convergence judgment unit 27 causes to perform repetition.

Figure 8:
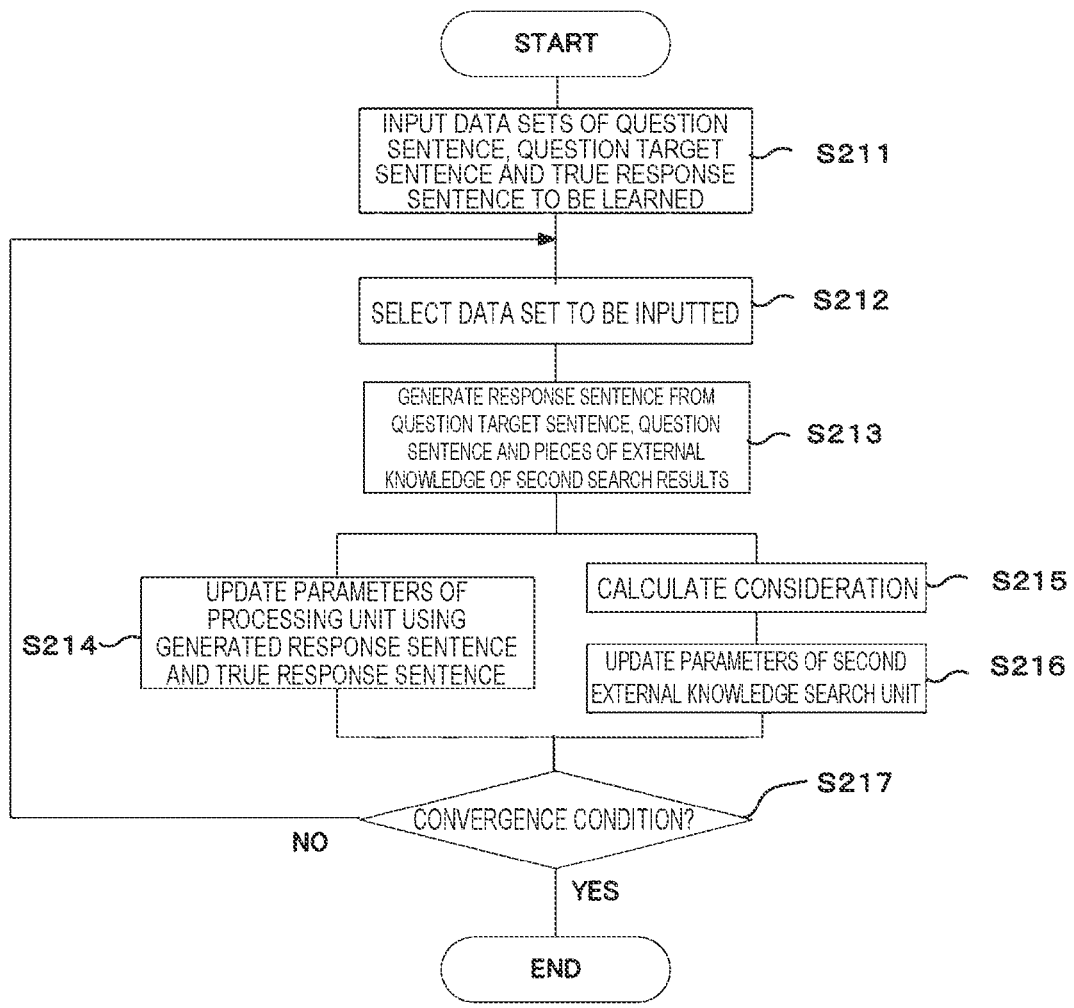
FIG. 8 is a flowchart showing a flow of a learning process using a gradient method by the learning device according to the second embodiment of the present invention.

Next, a flow of a learning process by the learning device 1b in the second embodiment will be described using a flowchart of FIG. 8. FIG. 8 illustrates a case where the gradient method of (i) is used for learning of the processing unit 14.

First, at step S211, the input unit 10 accepts input of a plurality of data sets each of which includes a question sentence Q, a question target sentence P and a true response sentence T to be learned.

At step S212, the learning unit 26 selects one data set to be inputted to the processing unit 14 from among all the inputted data sets. Next, at step S213, search by the first external knowledge search unit 11 and search by the second external knowledge search unit 22 are performed using the question target sentence P and the question sentence Q, and the second search results R2 are obtained. Then, generation of an external knowledge combined question target sentence PR is performed by the external knowledge combination unit 13. Then, the external knowledge combined question target sentence PR is inputted to the processing unit 14, and a response sentence A is acquired. At step S214, the learning unit 26 updates the parameters of the processing unit 14 using the response sentence A and the true response sentence T.

At step S215, the consideration calculation unit 23 calculates a consideration v. Next, at step S216, the learning unit 26 performs reinforcement learning using a policy and the consideration v and updates the parameters of the second external knowledge search unit 22.

At step S217, the convergence judgment unit 27 makes a judgment about a convergence condition. If the convergence condition has not been reached, the judgment of step S217 is negative. Steps S212 to S216 are repeated, and the parameters are updated. When the convergence condition is reached, the judgment of step S217 is positive, and update of the parameters ends.

Thus, by performing reinforcement learning for a second external knowledge search unit, it becomes possible to increase accuracy of pieces of external knowledge included in second search results, and it is possible to cause a more appropriate response sentence to be outputted from a processing unit.

Next, a flow of a learning process by the learning device 1b, in which the reinforcement learning of (ii) is used for learning of the processing unit 14, in the second embodiment will be described using a flowchart of FIG. 9.

Figure 9:
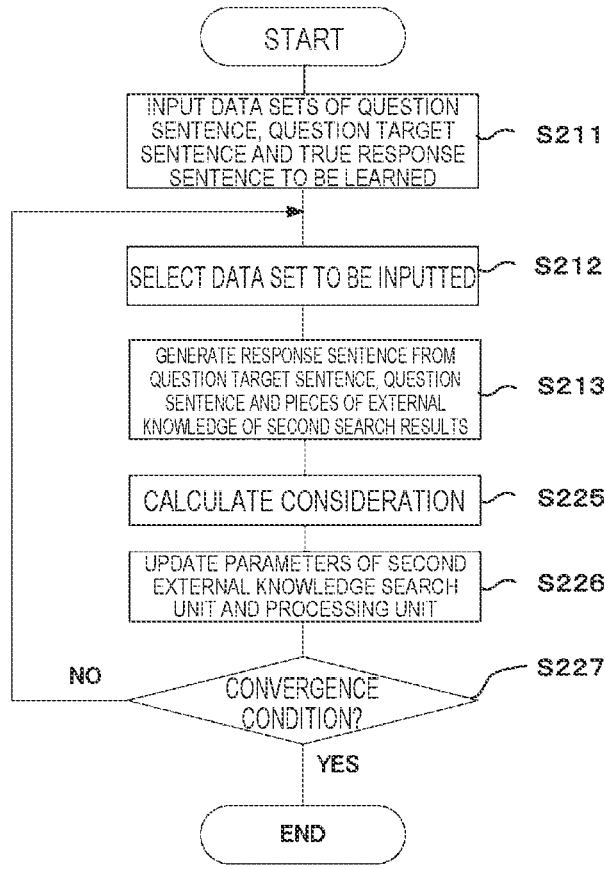
FIG. 9 is a flowchart showing a flow of a learning process using reinforcement learning by the learning device according to the second embodiment of the present invention.

Since steps S211 to S213 in FIG. 9 are similar to the learning method using the gradient method in FIG. 8, detailed description will be omitted.

At step S225, the consideration calculation unit 23 calculates a consideration v. Next, at step S226, the learning unit 26 updates the parameters of both of the processing unit 14 and the second external knowledge search unit 22 using a policy and the consideration v.

At step S227, the convergence judgment unit 27 makes a judgment about a convergence condition. If the convergence condition has not been reached, the judgment of step S227 is negative. Steps S212 to S226 are repeated, and the parameters are updated. When the convergence condition is reached, the judgment of step S227 is positive, and update of the parameters is ended.

Thus, by performing reinforcement learning for the whole of a second external knowledge search unit and a processing unit, it is possible to cause a flexible response sentence appropriate for a question sentence to be outputted.

Since, in the second embodiment, the second external knowledge search unit of the first embodiment is configured so that learning of parameters is required as described above, it becomes possible to perform reinforcement learning for a second external knowledge search unit or perform reinforcement learning for the second external knowledge search unit and a processing unit. Thereby, by causing parameters of a first neural network used by the second external knowledge search unit and a second neural network used by a processing unit to be learned in advance, it is possible to cause a more appropriate response sentence to be outputted.

Next, a third embodiment will be described. Description will be made on a case where an external knowledge search method of the present invention is used for dialogue processing for obtaining a response sentence as an answer to an input sentence in a processing device of the third embodiment.

Figure 10:
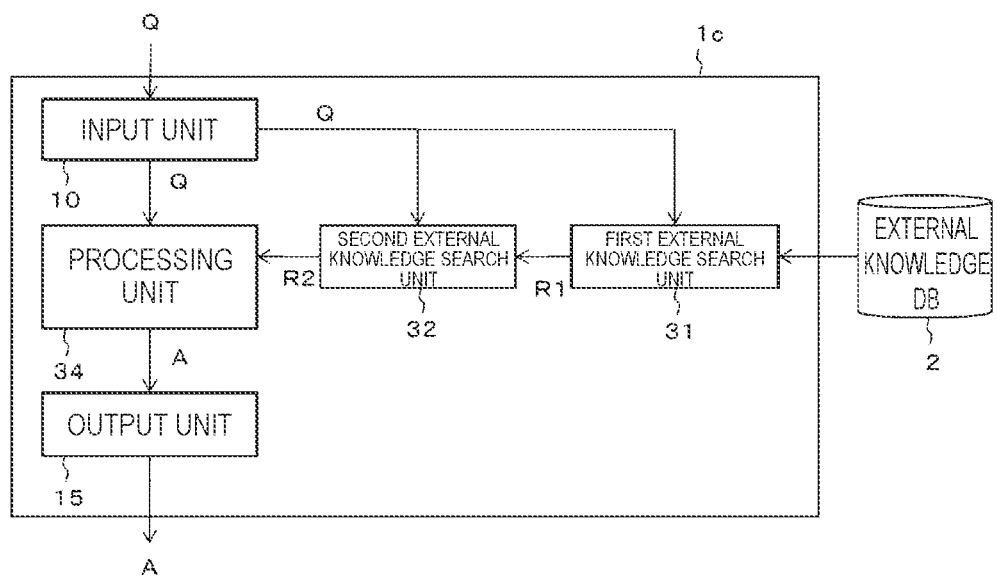
FIG. 10 is a block diagram showing a configuration of a processing device according to a third embodiment of the present invention.

FIG. 10 is a functional block diagram showing an example of a configuration of a processing device 1c according to the third embodiment of the present invention. Components similar to those of the first embodiment will be given the same reference numerals, and detailed description will be omitted. The description will be made on a case where an input sentence Q is a question sentence. Hereinafter, a question sentence is indicated by Q.

The processing device 1c of the third embodiment is provided with an input unit 10, a first external knowledge search unit 31, a second external knowledge search unit 32, a processing unit 34 and an output unit 15.

The first external knowledge search unit 31 searches for pieces of external knowledge from the external knowledge database 2 based on first scores obtained from similarity degrees between the pieces of external knowledge included in the external knowledge database 2 and a question sentence Q and causes the pieces of external knowledge to be first search results R1. As for the first similarity degrees, the first similarity degrees are determined using a method of comparing appearance frequencies of words included in sentences, such as TF-IDF, similarly to the first embodiment. Ranking is performed using the first scores defined by the first similarity degrees, and, for example, a specified number of pieces of external knowledge from the top are outputted as the first search results R1. Or alternatively, pieces of external knowledge having first scores equal to or above a predetermined value are outputted as the first search results R1.

Similarly to the first embodiment, the second external knowledge search unit 32 searches the first search results R1 by the first external knowledge search unit 31 using a neural network learned in advance to obtain second search results R2. First, the second external knowledge search unit 32 converts the question sentence Q and the pieces of external knowledge included in the first search results R1 to fixed-length vectors using a neural network. Then, the second external knowledge search unit 32 causes scores using similarity degrees between the fixed-length question sentence vector of the question sentence Q and the fixed-length external knowledge vectors of the pieces of external knowledge included in the first search results R1 to be second similarity degrees. The second external knowledge search unit 32 performs ranking using the second scores defined by the second similarity degrees, and outputs, for example, a predetermined number of pieces of external knowledge from the top as the second search results R2. Or alternatively, the second external knowledge search unit 32 outputs pieces of external knowledge having second scores equal to or above a predetermined value are outputted as the second search results R2.

The above scores using similarity degrees are determined similarly to the search algorithm of FIG. 6. In the present embodiment, however, a question target sentence P does not exist unlike the second embodiment. Therefore, the question sentence Q in the present embodiment is used instead of the question target sentence P in the second embodiment. It is assumed that the question sentence Q in the second embodiment does not exist, and scores are calculated on the assumption that a term about a question sentence Q does not exist in each of Formulas (1), (2) and (3).

The processing unit 34 generates a response sentence A from the question sentence Q and the pieces of external knowledge included in the second search results R2 by a response sentence generation process. Various methods can be used as the response sentence generation process. For example, the response sentence A is generated by performing input into a neural network of the multitask Seq2Seq processing described in Reference Literature 1.

Figure 11:
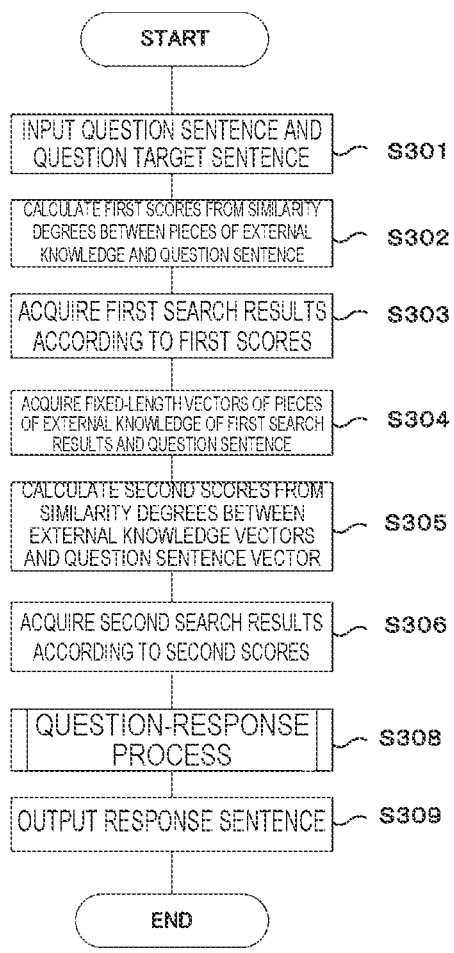
FIG. 11 is a flowchart showing a flow of a response sentence output process by the processing device according to the third embodiment of the present invention.

Next, a flow of a response sentence output process by the processing device 1c in the third embodiment will be described using a flowchart of FIG. 11.

At step S301, the input unit 10 accepts input of a question sentence Q. The first external knowledge search unit 31 searches the pieces of external knowledge stored in the external knowledge database 2, with the question sentence Q as a query. At step S102, the first external knowledge search unit 31 calculates similarity degrees between the pieces of external knowledge and the question sentence Q using TF-IDF and causes the similarity degrees as the first scores. The first search results R1 are acquired according to ranking of the first scores.

Next, the second external knowledge search unit 32 further searches the first search results R1 based on a neural network learned in advance (a first neural network) using the question sentence Q. At step S304, the second external knowledge search unit 32 acquires fixed-length vectors of the pieces of external knowledge of the first search results R1 and the question sentence Q using the neural network first. At step S305, the second external knowledge search unit 32 calculates similarity degrees between the external knowledge vectors and the question sentence vector, and causes the similarity degrees to be the second scores. At step S306, the second external knowledge search unit 32 acquires the second search results R2 from the pieces of external knowledge included in the first search results R1 according to ranking of the second scores.

Furthermore, at step S308, the question sentence Q and pieces of external knowledge included in the second search results R2 are inputted to the processing unit 34, and a response sentence A is obtained. Lastly, at step S309, the output unit 15 displays the response sentence A on a screen of a display device of a computer.

In the third embodiment described above, description have been made on the case where the two-stage search method of the present invention is used for dialogue processing for generating a response sentence to a question sentence. The two-stage search method of the present invention can be applied to any natural language processing.

For example, in the algorithm for the response sentence generation process described in the first and second embodiments, a summarization target sentence, instead of a question target sentence, is set as a processing target sentence P, and a title of the summarization target sentence, instead of a question sentence, is set as an input sentence Q. In this case, by a processing unit being configured to generate a summarization sentence with the input sentence Q and the processing target sentence P as an input, the invention of the present application can be also applied to a summarization process.

Figure 12:
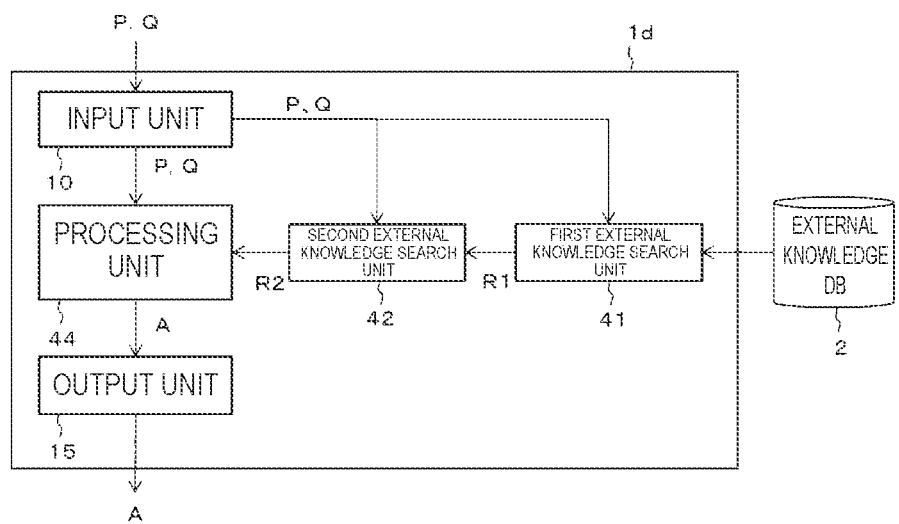
FIG. 12 is a block diagram showing a configuration of a modification of the processing device of the present invention.
Figure 13:
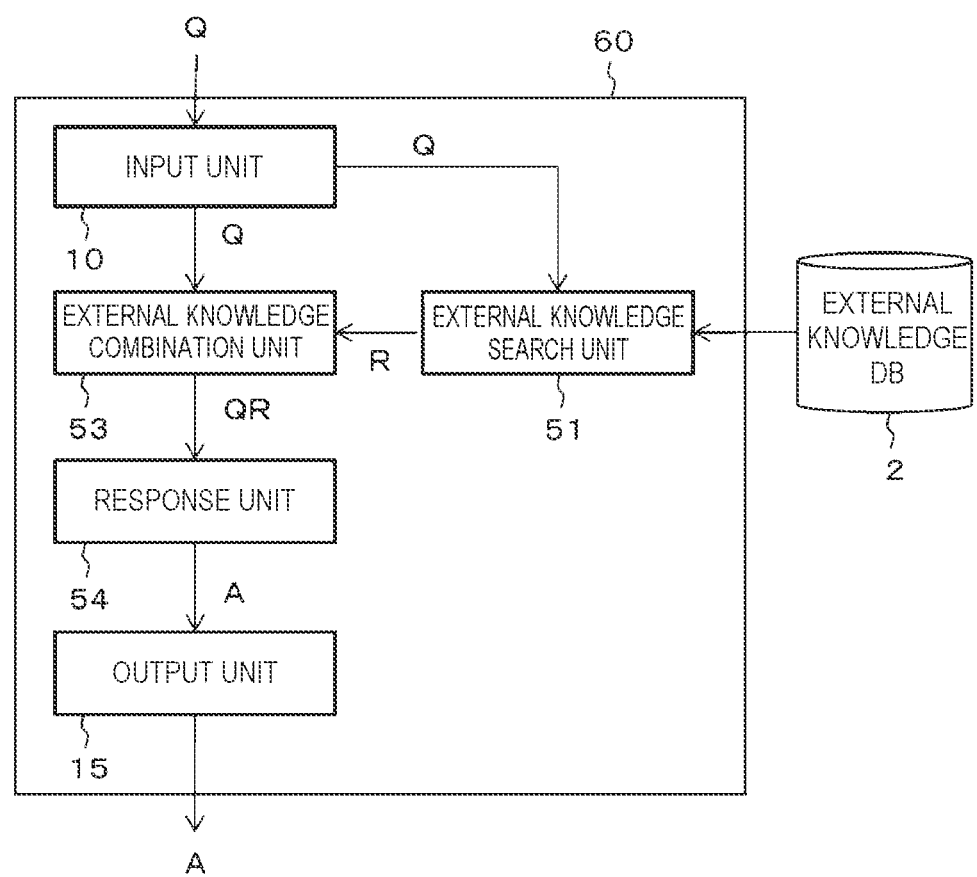
FIG. 13 is a block diagram showing a configuration of a conventional device.

Further, as shown in FIG. 12, each of a first external knowledge search unit 41, a second external knowledge search unit 42 and a processing unit 44 can be configured as below. As the first external knowledge search unit 41, the first external knowledge search unit of the first or third embodiment is used. As the second external knowledge search unit 42, the second external knowledge search unit of the first, second or third embodiment is used. The processing unit 44 is a classifier or a generator using any natural language processing, with at least one of an input sentence Q and a processing target sentence P as an input. For example, the processing target sentence P of the algorithm described above may be replaced with a determination target sentence to output a determination result as a response sentence A.

Note that the present invention is not limited to the embodiments described above, and various modifications and applications are possible within a range not departing from the spirit of the present invention.

Note that, in the above embodiments, a CPU (Central Processing Unit), which is a general-purpose processor, is used as the processor. Furthermore, it is preferred to provide a GPU (Graphics Processing Unit) as necessary. Further, a part of the functions described above may be realized using a PLD (Programmable Logic Device) which is a processor the circuit configuration of which can be changed after manufacture, such as an FPGA (Field Programmable Gate Array), a dedicated electric circuit having a circuit configuration exclusively designed to cause particular processing to be executed, such as an ASIC (Application Specific Integrated Circuit), or the like.

REFERENCE SIGNS LIST 1, 1a, 1b, 1c Processing device
2 External knowledge database
10 Input unit
11, 31, 41 First external knowledge search unit
12, 22, 32, 42 Second external knowledge search unit
13, 53 External knowledge combination unit
14, 24, 34, 44 Processing unit
15 Output unit
16, 26 Learning unit
23 Consideration calculation unit
27 Convergence judgment unit
51 External knowledge search unit
54 Response unit
A Response sentence
P Processing target sentence
PR External knowledge combined question target sentence
Q Input sentence
R1 First search results
R2 Second search results
v Consideration

The invention claimed is:

1. A learning device comprising a processor configured to execute operations comprising:
determining scores based on similarity degrees between an input sentence and pieces of external knowledge stored in an external knowledge database;
selecting at least a part of the pieces of external knowledge based on the scores as search results;
acquiring an output to the input sentence based on predetermined arithmetic processing using the input sentence and the selected at least a part of the pieces of external knowledge as inputs;
determining, based on a combination of the input sentence, the acquired output, the selected pieces of external knowledge, and a true output given to the input sentence in advance, a reward, wherein the reward is based on a first index and a second index, the first index indicates correctness of the acquired output relative to the true output, and the second index indicates a quality of the selected at least a part of the pieces of external knowledge; and
learning a first neural network by updating parameters of the first neural network using the reward.

2. The learning device according to claim 1, the processor further configured to execute operations comprising:
selecting, using a processing target sentence and the input sentence as an input to the first neural network, the at least a part of the pieces of external knowledge based on a first similarity degree and a second similarity degree, the first similarity degree indicates similarity between the pieces of external knowledge in the external knowledge database and the input sentence, and the second similarity degree indicates similarity between the pieces of external knowledge and the processing target sentence;
generating an external knowledge combination process target sentence, wherein the external knowledge combination process target sentence comprises the selected at least a part of the pieces of external knowledge and the processing target sentence;
acquiring an output to the input sentence by the predetermined arithmetic processing using the input sentence and the external knowledge combination process target sentence as an input; and
determining, based on a combination comprising the processing target sentence, the input sentence, the acquired output, the selected pieces of external knowledge, and the true output given to the input sentence in advance, the reward, wherein the reward is according to the first index and the second index. the first index indicates the correctness of the output relative to the true output, and the second index indicates the quality of the at least a part of the selected pieces of external knowledge.

3. The learning device according to claim 1,
wherein the input sentence comprises a question sentence, and
the processor further configured to execute operation comprising generating, by a second neural network, the response sentence in response to the question sentence by executing the predetermined arithmetic processing,
wherein the learning further comprises updating the parameters of the first neural network and parameters of the second neural network according to the reward.

4. A computer-implemented method for learning, comprising:
determining scores based on obtained from similarity degrees between an input sentence and pieces of external knowledge stored in an external knowledge database;
selecting at least a part of the pieces of external knowledge based on the scores as search results;
acquiring an output to the input sentence based on predetermined arithmetic processing using the input sentence and the selected at least a part of the pieces of external knowledge as inputs;
determining, based on a combination of the input sentence, the acquired output, the selected pieces of external knowledge, and a true output given to the input sentence in advance, a reward, therein the reward is based on a first index and a second index, the first index indicates correctness of the output relative to the true output, and the second index indicates quality of the selected at least a part of the pieces of external knowledge; and
learning a first neural network by updating parameters of the first neural network using the reward.

5. A computer-readable non-transitory recording medium storing a computer-executable program instructions that when executed by a processor cause a computer system to:
determine scores based on similarity degrees between an input sentence and pieces of external knowledge stored in an external knowledge database;
selecting at least a part of the pieces of external knowledge based on the scores as search results;
acquire an output to the input sentence based on predetermined arithmetic processing using the input sentence and the selected at least a part of the pieces of external knowledge as inputs;
determine based on a combination of the input sentence, the acquired output, the selected pieces of external knowledge, and a true output given to the input sentence in advance, a reward, wherein the reward is based on a first index and a second index, the first index indicates correctness of the output relative to the true output, and the second index indicates quality of the selected pieces of external knowledge; and
learning a first neural network by updating parameters of the first neural network using the reward.

6. The learning device according to claim 1, wherein the at least a part of the pieces of external knowledge includes a plurality of sentences in a natural language.

7. The learning device according to claim 3, wherein the learning further comprises updating the parameters of the first neural network and parameters of the second neural network based on a policy gradient method.

8. The learning device according to claim 1, wherein the first index comprises an index for evaluating an automatic summarization process in a natural language processing.

9. The learning device according to claim 2,
wherein the input sentence comprises a question sentence, and
the processor further configured to execute operation comprising generating, by a second neural network, the response sentence based on the question sentence by executing the predetermined arithmetic processing,
wherein the learning further comprises updating the parameters of the first neural network and parameters of the second neural network according to the reward.

10. The computer-implemented method according to claim 4, the method further comprising:
selecting, using a processing target sentence and the input sentence as inputs to the first neural network, the at least a part of the pieces of external knowledge based on a first similarity degree and a second similarity degree, the first of similarity degrees, indicates similarity between the pieces of external knowledge in the external knowledge database and the input sentence, and the second similarity degree indicates similarity between the pieces of external knowledge and the processing target sentence;
generating an external knowledge combination process target sentence, wherein the external knowledge combination process target sentence comprises the selected at least a part of the pieces of external knowledge and the processing target sentence,
acquiring an output to the input sentence by the predetermined arithmetic processing using the input sentence and the external knowledge combination process target sentence as an input, and
determining, based on a combination comprising the processing target sentence, the input sentence, the acquired output, the selected pieces of external knowledge, and the true output given to the input sentence in advance, the reward, wherein the reward is according to the first index and the second index, the first index indicates the correctness of the output relative to the true output, and the second index indicates the quality of the selected at least a part of the pieces of external knowledge.

11. The computer-implemented method according to claim 4,
wherein the input sentence comprises a question sentence, and
generating, by a second neural network, a response sentence based on the question sentence by executing a as the predetermined arithmetic processing,
wherein the learning further comprises updating the parameters of the first neural network and parameters of the second neural network according to the reward.

12. The computer-implemented method according to claim 4, wherein the at least a part of the pieces of external knowledge includes a plurality of sentences in a natural language.

13. The computer-implemented method according to claim 11, wherein the learning further comprises updating the parameters of the first neural network and parameters of the second neural network based on a policy gradient method.

14. The computer-implemented method according to claim 4, wherein the first index comprises an index for evaluating an automatic summarization process in a natural language processing.

15. The computer-implemented method according to claim 10,
wherein the input sentence comprises a question sentence, and
the method further comprising generating, by a second neural network, a response sentence based on the question sentence by executing the predetermined arithmetic processing,
wherein the learning further comprises updating the parameters of the first neural network and parameters of the second neural network according to the reward.

16. The computer-readable non-transitory recording medium according to claim 5, the computer-executable program instructions when executed further causing the system to:
select, using a processing target sentence and the input sentence as inputs to the first neural network, the at least a part of the pieces of external knowledge based on a first similarity degree and a second similarity degree, the first similarity degrees, indicates similarity between the pieces of external knowledge in the external knowledge database and the input sentence, and the second similarity degree indicates similarity between the pieces of external knowledge and the processing target sentence;
generate an external knowledge combination process target sentence, wherein the external knowledge combination process target sentence comprises the selected at least a part of the pieces of external knowledge and the processing target sentence,
acquire an output to the input sentence by the predetermined arithmetic processing using the input sentence and the external knowledge combination process target sentence as an input, and
determine, based on a combination comprising the processing target sentence, the input sentence, the acquired output, the selected pieces of external knowledge, and the true output given to the input sentence in advance, the reward, wherein the reward is according to the first index and the second index, the first index indicates the correctness of the output relative to the true output, and the second index indicates the quality of the selected at least a part of the selected pieces of external knowledge.

17. The computer-readable non-transitory recording medium according to claim 5,
wherein the input sentence comprises a question sentence, and
the computer-executable program instructions when executed further causing the system to generate, by a second neural network, a response sentence based on the question sentence by executing network as the predetermined arithmetic processing,
wherein the learning further comprises updating the parameters of the first neural network and parameters of the second neural network according to the reward.

18. The computer-readable non-transitory recording medium according to claim 5, wherein the at least a part of the pieces of external knowledge includes a plurality of sentences in a natural language.

19. The computer-readable non-transitory recording medium according to claim 5, wherein the learning further comprises updating the parameters of the first neural network and parameters of the second neural network based on a policy gradient method.

20. The computer-readable non-transitory recording medium according to claim 16,
- wherein the input sentence comprises a question sentence, and
- the computer-executable program instructions when executed further causing the system to generate, by a second neural network, a response sentence based on the question sentence by executing the predetermined arithmetic processing,
- wherein the learning further comprises updating the parameters of the first neural network and parameters of the second neural network according to the reward.

* * * * *